United States Patent
Jacob et al.

(10) Patent No.: US 9,296,294 B2
(45) Date of Patent: Mar. 29, 2016

(54) NOISE REDUCTION BAFFLE AND PLASTIC FUEL TANK COMPRISING SUCH A BAFFLE

(75) Inventors: Pierre Jacob, Compiegne (FR); Yohann L'Hermite, Margny-les-Compiegne (FR); Herve Guillerme, Thiescourt (FR); Thibaut Prouveur, Paris (FR); Laurent Guyotte, Saint Martin Longueau (FR)

(73) Assignee: INERGY AUTOMOTIVE SYSTEMS RESEARCH (Societe Anonyme), Brussels (BE)

( * ) Notice: Subject to any disclaimer, the term of this patent is extended or adjusted under 35 U.S.C. 154(b) by 1229 days.

(21) Appl. No.: 13/063,137

(22) PCT Filed: Sep. 9, 2009

(86) PCT No.: PCT/EP2009/061681
§ 371 (c)(1),
(2), (4) Date: Mar. 9, 2011

(87) PCT Pub. No.: WO2010/029103
PCT Pub. Date: Mar. 18, 2010

(65) Prior Publication Data
US 2011/0155743 A1 Jun. 30, 2011

Related U.S. Application Data

(60) Provisional application No. 61/095,664, filed on Sep. 10, 2008.

(51) Int. Cl.
*B65D 88/12* (2006.01)
*B60K 15/077* (2006.01)
*B60K 15/03* (2006.01)

(52) U.S. Cl.
CPC ......... *B60K 15/077* (2013.01); *B60K 15/03177* (2013.01)

(58) Field of Classification Search
CPC ............................. B65D 88/12; B60K 15/077
USPC ................................ 220/8, 563; 137/574, 567
See application file for complete search history.

(56) References Cited

U.S. PATENT DOCUMENTS 2,091,731 A * 8/1937 Gredell .......................... 220/564
3,514,008 A * 5/1970 Dorn ................................. 220/8

(Continued)

FOREIGN PATENT DOCUMENTS

CA      2413989 A1    6/2004
CN      201091378 Y   7/2008

(Continued)

OTHER PUBLICATIONS

Search Report issued Mar. 4, 2013 in Chinese Application No. 200980137797.7 (English Translation).

*Primary Examiner* — Fenn Mathew
*Assistant Examiner* — Elizabeth Volz
(74) *Attorney, Agent, or Firm* — Oblon, McClelland, Maier & Neustadt, L.L.P.

(57) ABSTRACT

Noise reduction baffle for a fuel tank comprising a lower carrier and an upper sliding part which can slide relatively to the carrier thanks to compression springs mounted on retainers, said lower carrier having a hollow foot comprising two vertical or inclined walls defining an open cavity of elongated shape having a longitudinal axis, said cavity comprising at least one rib making an angle with the longitudinal axis of the cavity.

15 Claims, 6 Drawing Sheets

(56) References Cited

U.S. PATENT DOCUMENTS

| | | | |
|---|---|---|---|
| 4,046,279 A * | 9/1977 | Rosler | 220/8 |
| 5,346,092 A | 9/1994 | Gerhard | |
| 5,394,902 A * | 3/1995 | Shibao | 137/565.17 |
| 5,829,591 A * | 11/1998 | Lyons | 206/373 |
| 6,408,979 B1 * | 6/2002 | Forbes et al. | 181/198 |
| 2003/0015537 A1 * | 1/2003 | Konja | 220/563 |
| 2007/0289964 A1 * | 12/2007 | Mazzucchelli | 220/8 |
| 2008/0083753 A1 * | 4/2008 | Escobar et al. | 220/8 |

FOREIGN PATENT DOCUMENTS

| | | |
|---|---|---|
| DE | 861969 C | 1/1953 |
| DE | 9116117 U1 | 4/1993 |

\* cited by examiner

NOISE REDUCTION BAFFLE AND PLASTIC FUEL TANK COMPRISING SUCH A BAFFLE

CROSS-REFERENCE TO RELATED APPLICATIONS

This application is a U.S. national stage entry under 35 U.S.C. §371 of International Application No. PCT/EP2009/061681 filed Sep. 9, 2009, which claims priority to U.S. Provisional Application No. 61/095,664 filed Sep. 10, 2008, this application being herein incorporated by reference in its entirety for all purposes.

TECHNICAL FIELD OF THE INVENTION

The present invention relates to a noise reduction baffle and to a plastic fuel tank comprising such a baffle.

BACKGROUND OF THE INVENTION

Fuel systems on board vehicles of various types generally comprise a tank for storing fuel, and this tank generally comprises at least one internal accessory. One particular case of such accessories is that of noise reduction baffles, the purpose of which is to absorb the noise ("slosh" noise) associated with the waves which may be generated inside the tank when the vehicle accelerates rapidly, brakes, turns, etc. Such baffles are also known as "anti-slosh baffles" in the automotive field.

Generally, these baffles are fixed into the tank after its manufacture by inserting it through an opening in its wall, for instance the one through which the pumping module is inserted and fixed inside the tank, and which is afterwards closed tightly by a flange. The problem is that generally, the baffle has a size which is bigger than the one of the opening and/or is too long to be inserted through said hole.

To solve that problem, so called "retractable baffles" have been developed. One specific kind of such baffles is the one described in U.S. Pat. No. 6,408,979 and US 2003/0015537 and which comprises 2 parts: a lower carrier and an upper sliding part which can slide relatively to the carrier thanks to compression springs mounted on retainers formed on the lower wall of the carrier and extending upwardly. To insert the baffle into the tank, these springs are compressed (reducing the size of the assembly) and they are relieved once the baffle is in place so has to increase its size substantially to the tank height. To put and keep the baffle in place, retainer bumps or flanges are molded in the tank lower and upper wall.

However, owed to the very telescopic nature of the baffle assembly, it may happen in some circumstances (for instance during manipulations of the empty fuel tank before it is fixed inside the vehicle; in the case of choc, rapid movement with a substantial amount inside the tank, deformations due to internal pressure variations or aging etc....) that these baffles start to slide and even, come out of their flanges.

Besides, the geometry and size of these flanges is such that they reduce the inner volume of the tank and hence, its available capacity.

Another problem with the baffles described in these US titles is that, especially in the case where the baffle does not occupy the entire section of the fuel tank (as for instance depicted in FIG. 1 of U.S. Pat. No. '537), these baffles may translate inside their flanges and hence, damage the tank wall.

Finally, with the shape of the flanges illustrated in these documents, it is not easy for the operator who fixes the baffle(s) inside the tank to be sure that the baffle is correctly in place.

SUMMARY OF THE INVENTION

The present invention aims at solving these problems by providing a baffle and tank architecture which allows to secure easily and safely said baffle inside said fuel tank.

For this purpose, the present invention relates to a noise reduction baffle for a fuel tank comprising a lower carrier and an upper sliding part which can slide relatively to the carrier thanks to compression springs mounted on retainers, said lower carrier having a hollow foot comprising two vertical or inclined walls defining an open cavity of elongated shape having a longitudinal axis, said cavity comprising at least one rib making an angle with the longitudinal axis of the cavity.

The cavity of the foot of this baffle is aimed at receiving a flange molded in the tank wall and the rib inside this cavity is aimed at being fitted in a slit of corresponding shape and size into the flange.

Hence, the present invention also relates to a fuel tank equipped with a noise reduction baffle as described above, wherein the tank comprises a molded in flange with a slit and wherein the baffle is secured with its foot on the flange and with its rib inside the slit of said flange.

BRIEF DESCRIPTION OF THE DRAWINGS

For a detailed description of the invention, reference will now be made to the accompanying drawings in which.

DESCRIPTION OF THE PREFERRED EMBODIMENTS

Figure 1:
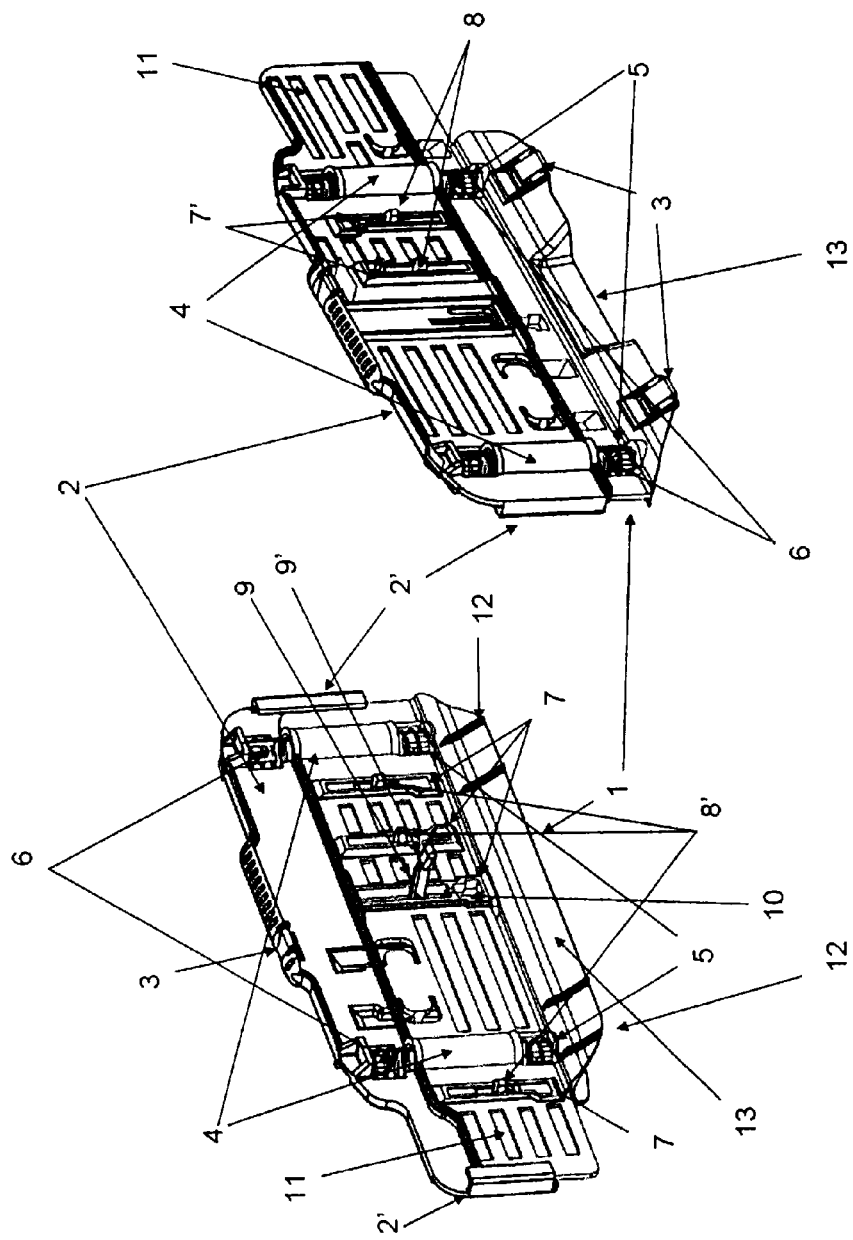
FIG. 1 shows two tri-dimensional views (one from each opposite side) of a baffle including some preferred embodiments of the invention.
Figure 2:
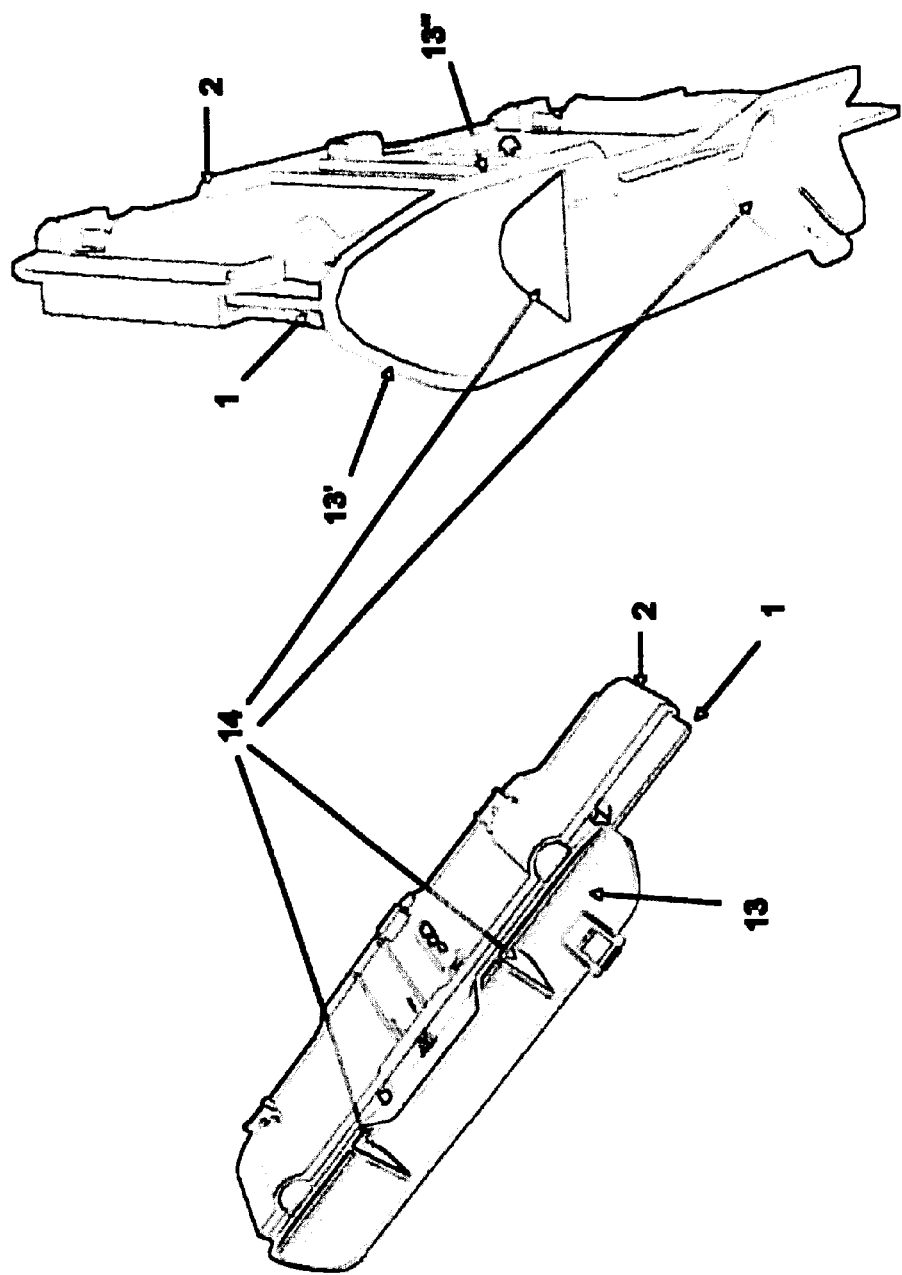
FIG. 2 shows two tri-dimensional views of the under-side of the lower carrier of the baffle.

The expression "fuel tank" is understood to mean a leak proof tank, able to store fuel under diverse and varied usage and environmental conditions. An example of this tank is that with which motor vehicles are fitted.

The fuel tank according to the invention is made with a plastic wall, generally comprising an internal face on its concave part and an external face on its convex part.

The term "plastic" is understood to mean any material comprising at least one synthetic polymer resin.

Any type of plastic may be suitable. Particularly suitable plastics belong to the category of thermoplastics.

The term "thermoplastic" is understood to mean any thermoplastic polymer, including thermoplastic elastomers, and also blends thereof. The term "polymer" is understood to mean both homopolymers and copolymers (especially binary or ternary copolymers). Examples of such copolymers are, in a non-limiting way: random copolymers, linear block copolymers, other block copolymers and graft copolymers.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersion in their molecular weight.

In particular, it is possible to use polyolefins, thermoplastic polyesters, polyketones, polyamides and copolymers thereof. A blend of polymers or copolymers may also be used similarly it is also possible to use a blend of polymeric materials with inorganic, organic and/or natural fillers such as, for example, but without limitation: carbon, salts and other inorganic derivatives, natural or polymeric fibres. It is also possible to use multilayer structures composed of stacked and joined layers comprising at least one of the polymers or copolymers described above.

One polymer that is often used is polyethylene. Excellent results have been obtained with high-density polyethylene (HDPE).

Preferably, the tank for which the process according to the invention is intended has a multilayer structure comprising at least one thermoplastic layer and at least one additional layer which, advantageously, may be formed from a material that is a barrier to liquids and/or gases.

Preferably, the nature and the thickness of the barrier layer are chosen so as to minimize the permeability of the liquids and gases in contact with the wall of the tank. Preferably, this layer is based on a barrier material, i.e. a fuel-impermeable resin such as, for example, EVOH (a partially hydrolysed ethylene/vinyl acetate copolymer). Alternatively, the tank may be subjected to a surface treatment (fluorination or sulfonation) for the purpose of making it impermeable to the fuel.

Fuel tanks based on outer HDPE layers with an internal EVOH layer are preferred.

By "baffle" is meant a part of a general flat (plate like) shape, which may have a contour of any shape and which has preferably holes in it in order to allow fuel to pass through it.

According to the invention, this baffle (plate) comprises a lower carrier, an upper sliding part and at least 2 springs which allow (by compression) the upper part to slide towards the carrier to reduce the size of the baffle and allow its insertion through an opening in the tank wall, and which, once the baffle has its foot on the retainer of the tank with the rib inside the slit, to urge the carrier and the upper sliding part respectively against the lower and upper surface of the tank.

Preferably, the carrier and the sliding part are made of plastic and most particularly preferably, of an elastic plastic having a good resistance to fuel like a polyacetal, and particularly POM (poly-oxy-methylene).

As to the springs, they are generally of a metal having a good resistance to fuel like stainless steel for instance. These springs are mounted on retainers which are preferably formed on the lower wall of the carrier and extend upwardly therefrom. Even more preferably, they are additionally mounted on retainers formed on the upper sliding part and which extend downwardly therefrom.

It is generally advantageous to be able to control if it is correctly located and secured to the tank before said tank is delivered to the car manufacturer and/or before it is mounted on a vehicle. Therefore, in the embodiment where the baffle is mainly made of plastic, it is preferable to equip said baffle with a least one metallic part on its upper or lower part (foot or head respectively). Preferably, there is a metallic part (like a disc or a folded strip for instance) both on the foot and the head and even more preferable, there a 3 such metallic parts (preferably 2 on the foot and one on the head) so as to be sure of the proper positioning of the baffle into the molded in flanges.

According to the invention, the lower carrier has a foot comprising two vertical or inclined walls defining an open cavity of elongated shape having a longitudinal axis, said cavity comprising at least one rib making an angle with the longitudinal axis of the cavity. This angle is preferably of at least 45°, even more preferably at least 60° and at most preferred: about 90° (which means that the ribs are then perpendicular to the axis). Preferably, there are 2 or more such ribs (depending on the length of the cavity).

Although the upper part may slide inside the carrier as described in the above mentioned prior art, according to a preferred embodiment of the invention, both parts are mere plane plates and the upper part slides along one surface of the lower carrier. In that embodiment, both parts bear 2 portions in relief having a hollow space in the shape of a half cylinder, the half cylinders of one part facing those of the other part so that they define a cavity where the compression springs are inserted. In that embodiment, the bottom of each half cylindrical hollow space preferably comprises a retainer for one extremity of a spring. These retainers may have any shape; preferably, they have the shape of a finger.

In order to guide the sliding of the upper part along one surface of the carrier, one of these parts preferably comprises a slit where a corresponding pin on the other part can slide. Preferably, this pin has a free end in the shape of a dome or a hook having at least one section bigger than the width of the slit. Most preferably, the slit has a folded, extended edge over which said dome or hook can slide. Pins bearing hooks are preferred over pins bearing domes because they are easier to inject and because they lead to less friction if they are designed to slide only over one edge of the slit.

In this embodiment, the baffle preferably comprises at least 2 and even more preferably, at least 3 pairs of pin/slit so that the sliding movement of the upper part on the carrier is guided optimally. Although one part may bear all the pins and the other, all the slits, it is preferable that each part bears both of them.

More preferably, each part (lower carrier and upper sliding part) comprises 3 pins and 3 slits, so that the baffle comprises 6 pairs of pins/slits.

According to a preferred sub-embodiment, one pin/slit pair is equipped with portions in relief which may cooperate to block the upper part against the lower carrier (by compressing the springs) so that the insertion of the baffle inside the tank is easier and safer for the operator. In that embodiment, the pin is advantageously provided with a tab at its extremity which eases the connection/disconnection of the portions in relief to block/unblock the "folded" baffle position. The fact of choosing a pin design improving its flexibility also eases this (dis) connection.

In again one sub-embodiment, said pin can slide into the entire slit which comprises a restriction through which the domed or hooked portion is forced.

A problem however that has been observed with that sub-embodiment is the fact that under some circumstances, if pressure is exerted on the tank (for instance if the tank falls (drops) or when the tank is compressed against the vehicle underbody the time needed to fix it using metallic latches) the baffle can be folded again suddenly and the pin can get blocked again in the restriction of the slit so that the baffle remains folded and falls down into the tank.

Accordingly, in a more preferred sub-embodiment, the pin can only slide into the slit once a portion in relief (tab) at its upper extremity has been and moved laterally (perpendicularly to the baffle) so as to pass underneath the upper edge of the slit. In that embodiment, in order to have enough flexibility to deform the pin (to allow the lateral movement of the portion in relief) while allowing the sliding of the 2 parts of the baffle (upper part and carrier) relative to each other, said pin preferably has the shape of an elongated tongue cut into the part of the baffle where it is located while being flush with its surface, said tongue bearing the above mentioned portion in relief.

In order to help grapping the end of the tongue bearing the tab to move it has described above, the other side of the tongue's extremity (opposed to the one bearing the tab) may comprise a portion in relief acting as a handle.

In that embodiment, the baffle remains generally blocked in its folded position because the tab of the tongue abuts on the upper edge of the slit and cannot be disengaged unless it is moved laterally (away from the baffle's surface). In a similar way, the baffle can only be put in its blocked position provided its tab is moved laterally. Such lateral movements have to be made manually and cannot happen accidentally in the above described situations.

It is worth noting that the above mentioned slits inside the carrier and/or the sliding part allow fuel to pass through the baffle, which is also advantageous. Allowing for the fuel to pass through the baffle is effective in maximizing energy dissipation (viscous forces) in comparison to a plain plate. It also allows introducing an additional amount of usable fuel within the fuel tank, by not creating areas where the fuel cannot enter or exit.

According to another preferred embodiment, which may be combined with the former ones, at least one lateral side of either the sliding part or the carrier may be provided with a folded edge which receives the lateral side of the other part so that again, the sliding movement is guided. Preferably, both lateral sides of one part have such a folded edge, said part being preferably the upper sliding part.

In order to reduce the weight of the baffle, it is advantageous to make the carrier and upper part as thin as possible but in order to keep the overall rigidity of the baffle, it is preferred to provide both parts with excavations and/or ribs with an adequate shape, size and location. This is part of the basic design/engineering of the baffle and can easily been optimized for instance using computer assisted design techniques.

The upper sliding part of the baffle according to the invention preferably comprises a head (as opposed to the foot of the carrier) which may also have a shape such that it cooperates with a portion in relief in the upper tank wall to secure the top of the baffle in the tank has well. This shape may be similar to the one of the foot (i.e. the head may comprise a hollow elongated cavity with a rib). However, since the baffle is already firmly secured to the tank by its foot, it may be sufficient to merely provide the head with an extension which can be inserted into molded flanges like in the above mentioned prior art. Depending on the geometry of the tank sealing at the place where the baffle is located, said head might even be "flat" i.e. matching said geometry without any extension.

The objective of FIGS. 1A to 7 is to illustrate certain concrete aspects of the invention, without wishing to restrict the scope thereof in any way.

Figure 3:
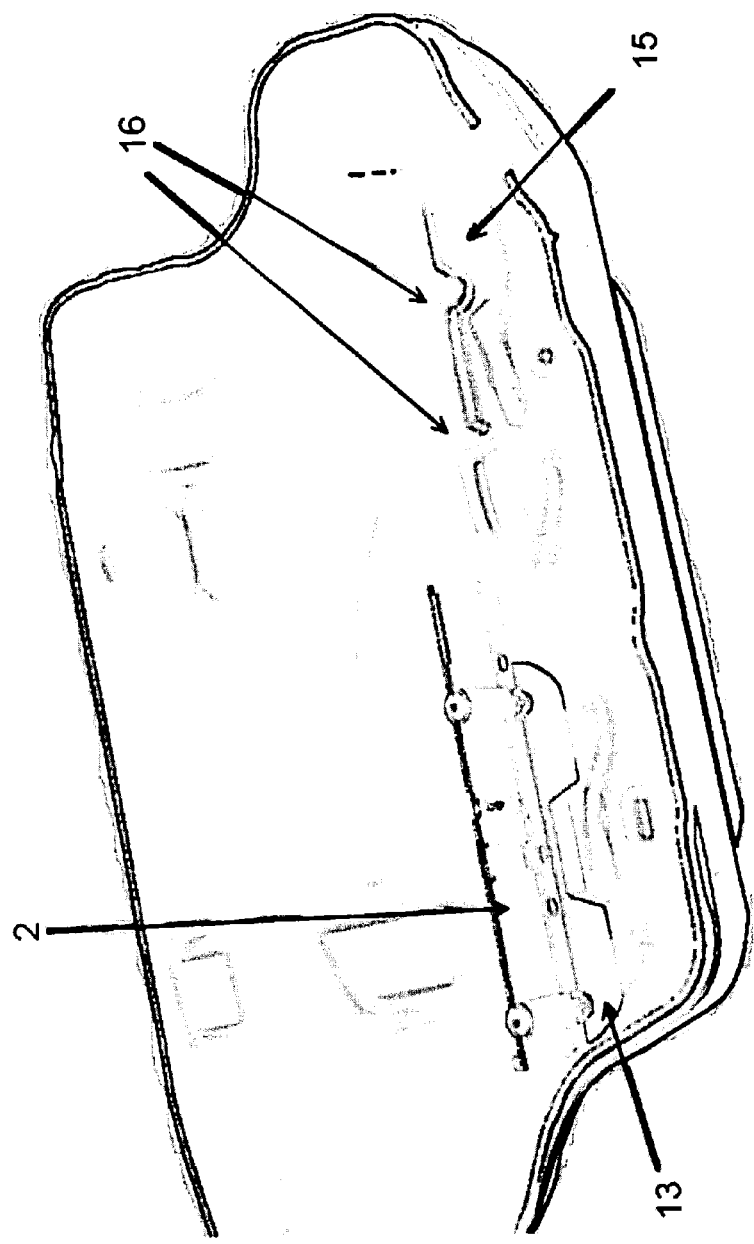
FIG. 3 shows the lower carrier of the baffle fixed to the lower part of a fuel tank.
Figure 4:
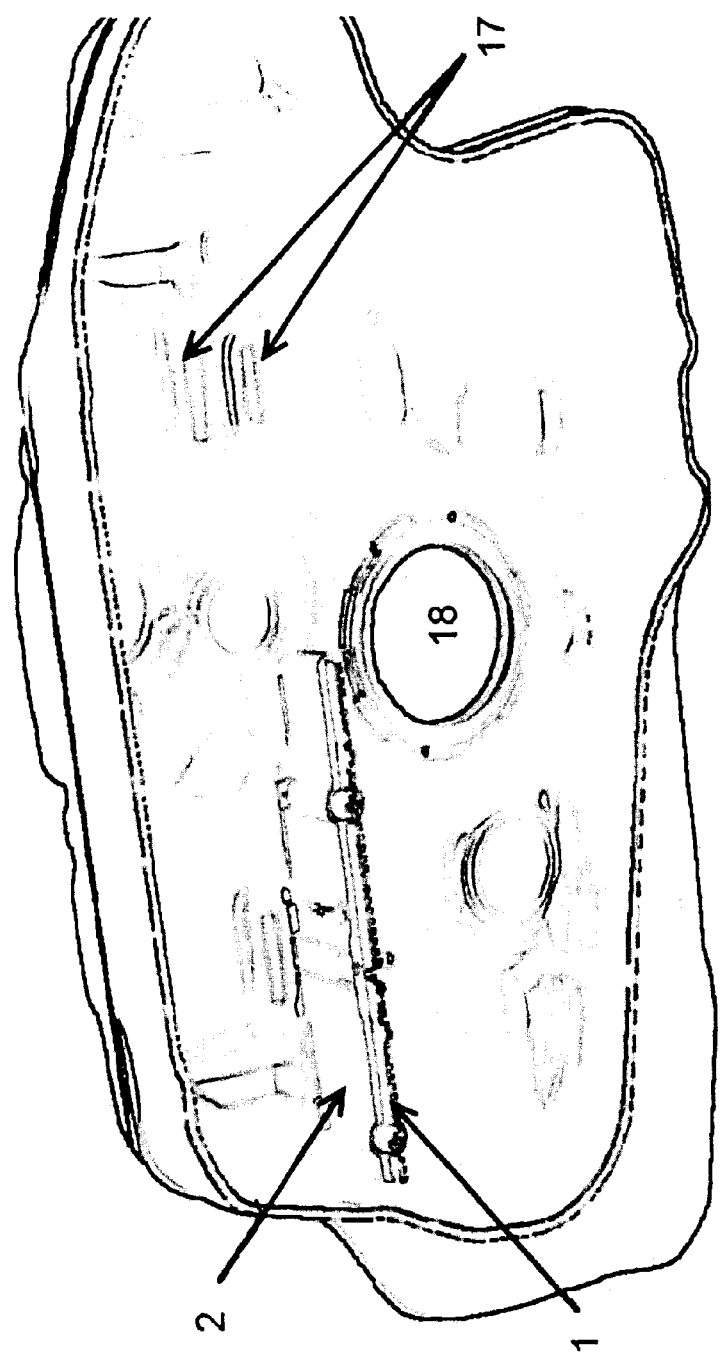
FIG. 4 shows the upper sliding part of the baffle fixed to the upper part of the fuel tank.
Figure 5:
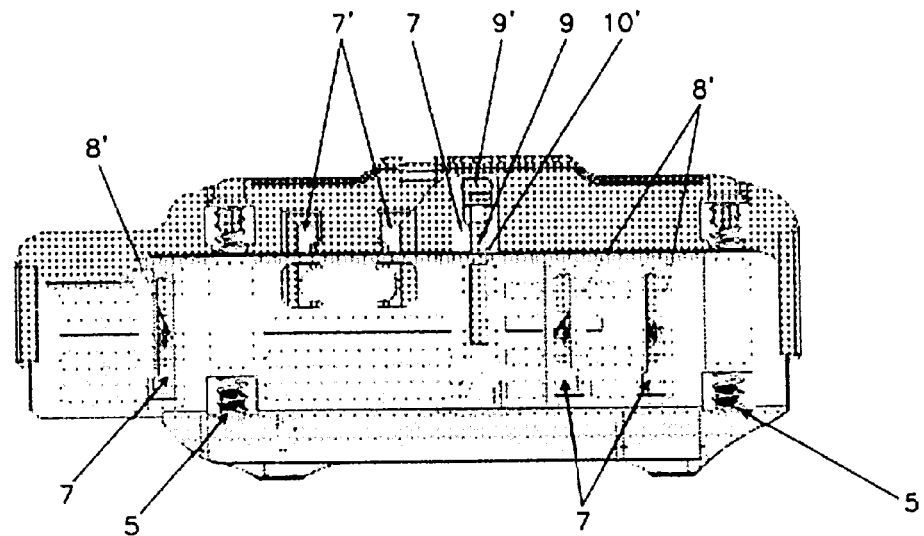
FIGS. 5 and 6 show two tri-dimensional views (one from each opposite side) of a baffle including other preferred embodiments of the invention.
Figure 6:
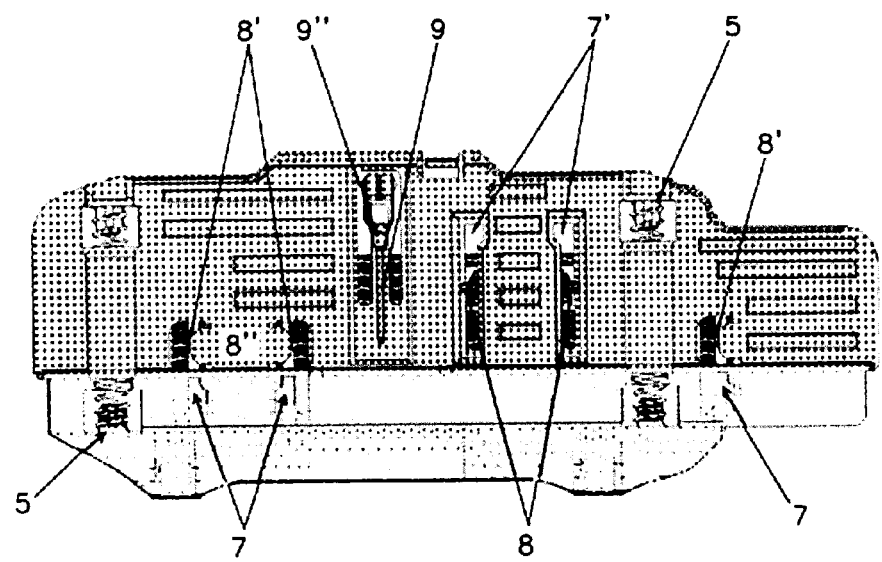
Figure 7:
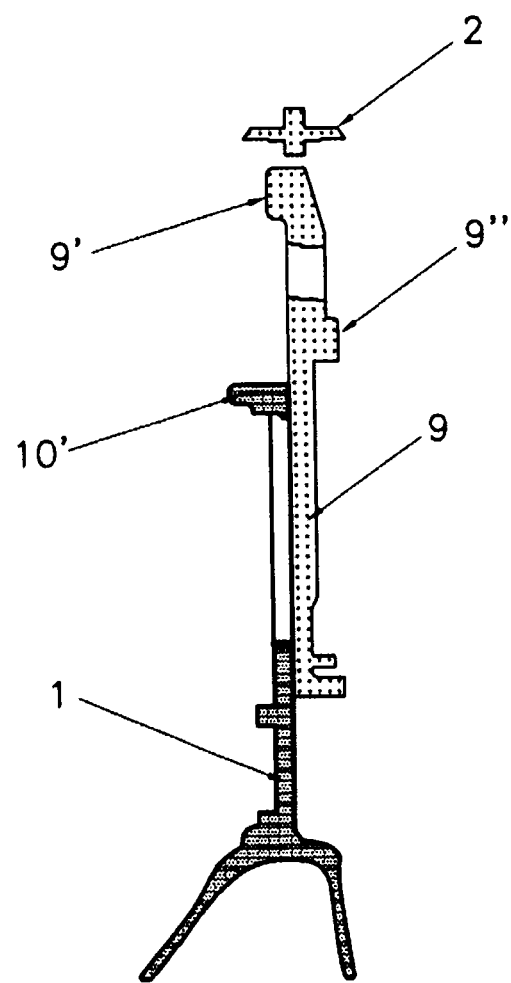
FIG. 7 shows a cut thereto according to dotted lines on FIGS. 5 and 6.

FIGS. 1A and 1B show 2 tri-dimensional views (one from each opposite side) of a baffle including some preferred embodiments of the invention. FIGS. 2A and 2B show 2 tri-dimensional views of the under side of the lower carrier of said baffle. FIG. 3 shows the lower carrier of a said baffle fixed to the lower part of a fuel tank FIG. 4 shows the upper sliding part of said baffle fixed to the upper part of the fuel tank. FIGS. 5 and 6 show tri-dimensional views (one from each opposite side) of a baffle including other preferred embodiments of the invention, and FIG. 7 shows a cut thereto according to the dotted lines on FIGS. 5 and 6.

In these figures, identical numbers designate identical or similar items.

The baffle illustrated therein comprises a lower carrier (1) and an upper sliding part (2) comprising folded edges (2') on its lateral sides which are able to slide on the lateral sides of the carrier (1). Both parts are made of POM and they bear metallic parts (3) which enable the control of the baffle location from the outside (using a metal detector, X-rays . . . ).

Both parts (1, 2) bear 2 portions in relief (4) having a hollow space in the shape of a half cylinder, the 2 half cylinders of one part facing those of the other part so that they define 2 cylindrical cavities where compression springs (5) are inserted and mounted on retainers (6) having the shape of fingers.

The lower carrier (1) comprises slits (7) and pins (8) which cooperate respectively with pins (8') and slits (7') in the upper part (2) in order to guide the sliding movement of said upper part (2) on the carrier (1) (or at least: assist the folded edges (2') therein). All the pins (8, 8') have a free end in the shape of a hook sliding over the folded, extended edge of the slits (7); except one (9) which has the shape of a lever and which cooperates with a mating portion in relief (10) in a slit (7) to provide a blocking mechanism keeping the springs (5) compressed for inserting the baffle safely into the tank. This pin (9) is provided with a tab (9') at its free end to ease the actuation of said mechanism.

In order to reduce the weight of the baffle while preserving its mechanical resistance, both parts (1, 2) comprise excavations (11) and ribs (12) with an adequate shape, size and location.

As can be seen on FIGS. 2A and 2B, the hollow foot (13) of the lower carrier (1) comprises two inclined walls (13', 13") defining an open cavity of elongated shape having a longitudinal axis and 2 ribs (14) which are perpendicular to the longitudinal axis of the cavity.

FIG. 3 shows the lower part of a fuel tank designed to receive 2 baffles and wherein one lower carrier (1) is secured on the left side while a place for fixing the other lower carrier is visible on the right side. As can be seen on this figure, the cavity of the foot (13) is aimed at receiving a flange (15) molded in the tank wall and the ribs (14) are designed to fit in slits (16) of corresponding shape and size into the flange (15).

FIG. 4 shows the other (upper) part of the same tank with an upper sliding part fixed on the left (plus a small piece of the lower carrier through which the cut is made) and molded in flanges (17) for fixing the upper sliding part of the other baffle on the right.

This picture also shows the opening (18) through which the baffles are inserted into the tank.

FIGS. 5 to 7 show both faces of a baffle including a preferred design for the blocking pair pin/slit, which as already been described above and according to which the pin (9) has the shape of a elongated tongue comprising:
  a tab (9') which has to be forced underneath the upper edge (10') of the slit (7) in order to block the baffle in its folded position (not shown in these figures, where the baffle is in its unfolded position); and
  on the side opposed to the one bearing the tab: a handle (9") which helps moving the upper part of the tongue (9) laterally to help it pass under/over the upper edge (10') of the slit in the lower carrier to respectively keep the baffle in its folded/unfolded position.

As can be seen on FIG. 7, which is a cut through a plane indicated by a dotted line in FIGS. 5 and 6, by pulling on the handle (9") to move it to the right side, one is able to deform the tongue and if together, pressure is exerted on the upper sliding part in order to compress the springs (5), the tab (9')

will go down (since it is in one piece with the upper sliding part (2)) and if it is maintained to the right during this movement, it can be released back to the left at the end of said movement (so that the tongue will be straight again) and be blocked under the upper edge (10') of the slit into the lower carrier (1).

The invention claimed is:

1. A noise reduction baffle for a fuel tank comprising:
a lower carrier; and
an upper sliding part configured to slide relatively to the lower carrier due to compression springs mounted on retainers,
wherein said lower carrier has a hollow foot including two vertical or inclined walls defining an open cavity of elongated shape having a longitudinal axis, said cavity including at least one rib making an angle with the longitudinal axis of the cavity, and
wherein the cavity of the foot of the baffle is configured to receive a flange moulded in the tank wall, and the rib inside the cavity is configured to be fitted in a slit of corresponding shape and size into the flange.

2. The noise reduction baffle according to claim 1, wherein the carrier and the sliding part are made of POM (poly-oxy-methylene).

3. The noise reduction baffle according to claim 1, wherein the springs are mounted on retainers formed respectively on the lower wall of the carrier and extend upwardly therefrom, and on retainers formed on the upper sliding part and which extend downwardly therefrom.

4. The noise reduction baffle according to claim 1, wherein the upper sliding part and the lower carrier are plane plates which both bear two portions in relief having a hollow space in the shape of a half cylinder, the half cylinders of one part facing those of the other part so that they define cavities where the compression springs are inserted, the bottom of each half cylindrical hollow space comprising a retainer for one extremity of a spring.

5. The noise reduction baffle according to claim 1, wherein the upper sliding part slides along one surface of the lower carrier, at least one of these parts comprising a slit where a corresponding pin on the other part can slide.

6. The noise reduction baffle according to claim 1, wherein both lateral sides of the upper sliding part are provided with folded edges which each receive a lateral side of the lower carrier.

7. The noise reduction baffle according to claim 1, wherein the carrier and the upper sliding part are provided with excavations and/or ribs.

8. The noise reduction baffle according to claim 1, wherein the upper sliding part comprises a head.

9. A fuel tank equipped with a noise reduction baffle according to claim 1, said tank comprising a molded in flange with a slit, the baffle being secured in the tank with its foot on the flange and with its rib inside the slit of the flange.

10. The noise reduction baffle according to claim 1, wherein said baffle is mainly made of plastic and is equipped with at least one metallic part on its upper sliding part or on its lower carrier.

11. The noise reduction baffle according to claim 10, comprising three metallic parts: two on the lower carrier and one on the upper sliding part.

12. The noise reduction baffle according to claim 1, said baffle comprising several pairs of pins/slits and wherein one pin/slit pair is a blocking pair and is equipped with portions in relief which cooperate to block the upper part against the lower carrier by compressing the springs, and with a tab at the pins extremity which eases the connection/disconnection of the portions in relief to block/unblock the baffle which is in a folded position.

13. The noise reduction baffle according to claim 12, wherein the pin of the blocking pair comprises a free end equipped with a dome or a hook, and wherein said pin can slide into the entire slit which comprises a restriction through which the domed or hooked portion is forced.

14. The noise reduction baffle according to claim 12, wherein the pin of the blocking pair can only slide into the slit once the tab at the pins upper extremity has been and moved perpendicularly to the baffle so as to pass underneath the upper edge of the slit.

15. The noise reduction baffle according to claim 14, wherein the pin of the blocking pair has the shape of an elongated tongue cut into the part of the baffle where it is located while being flush with its surface, said tongue bearing a handle on its extremity, on the side opposed to the one bearing the tab.

\* \* \* \* \*